Sept. 27, 1955    R. LAPSLEY    2,718,950
CLUTCH MECHANISM
Filed Dec. 5, 1951
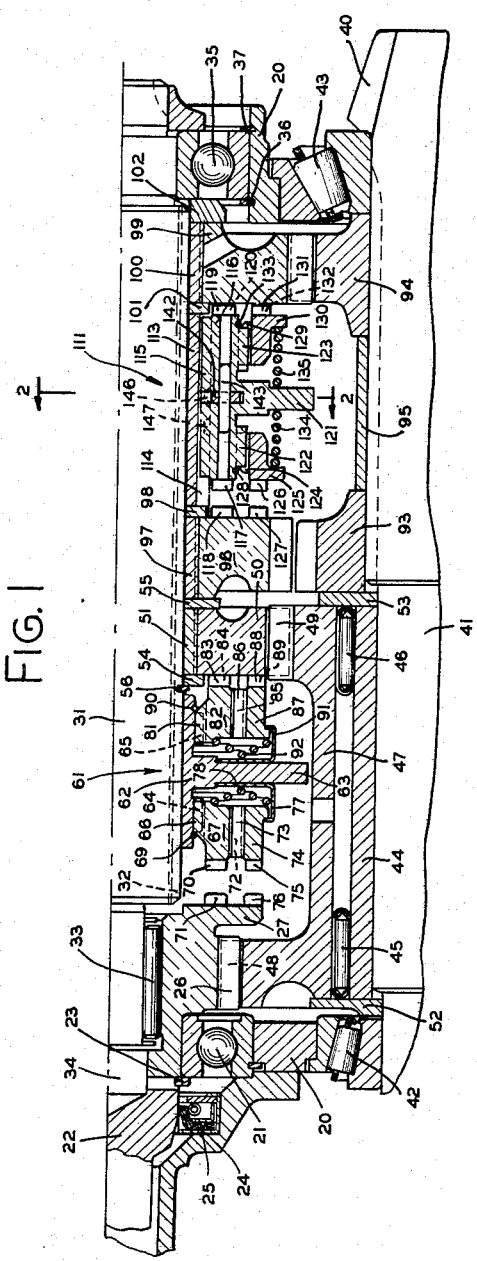
*INVENTOR.*
ROBERT LAPSLEY
BY
ATTYS.

United States Patent Office 2,718,950
Patented Sept. 27, 1955

2,718,950

CLUTCH MECHANISM

Robert Lapsley, Buchanan, Mich., assignor to Clark Equipment Company, Buchanan, Mich., a corporation of Michigan Application December 5, 1951, Serial No. 259,925

12 Claims. (Cl. 192—48)

My present invention relates generally to a transmission, and, more specifically, is directed to a two speed forward, two speed reverse transmission for commercial vehicles.

The transmission of my present invention comprises an input shaft, a main shaft, and an output shaft. Three axially spaced gears are preferably rotatably mounted on the main shaft, and first gear means is provided between the input shaft and one of the rotatable gears. Second gear means, including a reverse idler gear, is arranged between the second of the rotatable gears and the output shaft and third gear means is provided between the third rotatable gear and the output shaft.

It is an object of my present invention to provide a first clutch mechanism for selectively positively clutching either the input shaft or the first rotatable gear to the main shaft, irrespective of the direction of rotation of the main shaft relative to the input shaft or the first rotatable gear.

The first clutch mechanism of my present invention comprises four sets of cooperating uni-directional clutch or ratchet teeth. Assuming that the input shaft is tending to overrun the main shaft, the second set of clutch teeth are adapted to be automatically projected into an engaged position, for preventing counter rotation of the main shaft relative to the input shaft, at the instant that the first set of clutch teeth are being engaged for clutching the main shaft and input shaft together in the normal direction of rotation. If the main shaft is tending to overrun the input shaft, the first set of clutch teeth are adapted to be automatically projected into an engaged position, for preventing rotation of the input shaft in a normal direction relative to the main shaft, at the instant that the second set of clutch teeth are being engaged for clutching the input shaft and the main shaft together in a direction opposite to the normal direction of rotation.

If the first rotatable gear is tending to overrun the main shaft, the fourth set of clutch teeth are adapted to be automatically projected into an engaged position, for preventing counter rotation of the main shaft relative to the first rotatable gear, at the instant that the third set of cluch teeth are being engaged for clutching the main shaft and first rotatable gear together in the normal direction of rotation. When the main shaft tends to overrun the first rotatable gear, the third set of clutch teeth are adapted to be automatically projected into an engaged position, for preventing rotation of the first rotatable gear in a normal direction relative to the main shaft, at the instant that the fourth set of clutch teeth are being engaged for clutching the first rotatable gear and the main shaft together in a direction opposite to the normal direction of rotation.

It is another object of my present invention to provide a second clutch mechanism for selectively effecting either forward or reverse drive by positively clutching either the second rotatable gear or the third rotatable gear to the main shaft.

It is a further object of my present invention to provide a second clutch mechanism of the character indicated, wherein means are provided for preventing the clutch mechanism from being shifted from a forward to a reverse position or vice versa when the main shaft is rotating above a predetermined safe speed.

In accordance with the above objects, the second clutch mechanism is provided with four sets of cooperating uni-directional clutch or ratchet teeth. The second set of clutch teeth are adapted to be automatically projected into an engaged position, for preventing counter rotation of the rotatable gear relative to the main shaft, at the instant that the first set of clutch teeth are being engaged for clutching the second rotatable gear to the main shaft in the normal direction of rotation. The fourth set of clutch teeth are adapted to be automatically projected into an engaged position, for preventing counter rotation of the third rotatable gear relative to the main shaft, at the instant that the third set of clutch teeth are being engaged for clutching the third rotatable gear to the main shaft in the normal direction of rotation. A clutch hub is mounted for axial movement along the main shaft and is adapted to effect engagement of the first and third sets of clutch teeth.

The means for preventing the clutch mechanism from being shifted from a forward to a reverse position or vice versa, when the main shaft is rotating above a predetermined safe speed, comprises centrifugally actuated flyweights mounted within the clutch hub. Two sets of axially spaced notches are formed in the main shaft and the one ends of the flyweights are adapted to engage one of the sets of notches for preventing axial movement of the clutch hub and disengagement of the first and second sets of clutch teeth when the latter have been engaged and the main shaft rotates above a predetermined safe speed. The one ends of the flyweights are adapted to engage the other of the sets of notches for preventing axial movement of the clutch hub and disengagement of the third and fourth sets of clutch teeth when the latter have been engaged and the main shaft rotates above a predetermined safe speed. When the main shaft rotates below the predetermined safe speed, the ends of the flyweights are biased out of engagement with the notches in the main shaft and the clutch hub is free to be moved axially.

Now, in order to acquaint those skilled in the art with the manner of constructing and utilizing transmissions constructed in accordance with the principles of my present invention, I shall describe, in connection with the accompanying drawing, a preferred form of my invention.

In the drawing:

Figure 1 is a partial vertical sectional view showing the transmission of my present invention; and Figure 2 is a sectional view taken substantially along the line 2—2 in Figure 1, looking in the direction indicated by the arrows.

Referring now to the drawing, there is indicated at 20 a transmission housing, in the front end wall of which is mounted a ball bearing assembly 21. A drive or input shaft 22 is mounted for rotation in the ball bearing assembly 21. The input shaft 22 at its forward end is adapted to have driving connection with a prime mover (not shown) through a suitable main clutch (not shown). The ball bearing assembly 21 is retained in position by means of a retaining ring 23 and a suitable retaining cap 24, which is disposed concentrically about the input shaft 22. Interposed between the outer periphery of the input shaft 22 and the inner periphery of the retaining cap 24 is a suitable oil seal member 25, which is provided for preventing lubricant leakage from the transmission housing 20.

The rear end of the input shaft 22, inwardly of the transmission housing 20, is formed with a gear portion 26 and a radially outwardly extending flange portion 27.

Aligned coaxially of the input shaft 22 is a main shaft 31 which, at its outer periphery, is formed with longitudinally extending straight splines 32. The main shaft 31 at its forward end is piloted in needle bearings 33 which are arranged within a central opening 34 formed in the rear end of the input shaft 22. The main shaft 31 adjacent its rear end is mounted for rotation in a ball bearing assembly 35, secured within the rear end wall of the transmission housing 20. The ball bearing assembly 35 is maintained in position by means of retaining rings 36 and 37.

Arranged parallel to the main shaft 31 is an output or driven shaft 41 which, at its forward end, is rotatably mounted within a tapered roller bearing assembly 42 secured in the front end wall of the transmission housing 20. The output shaft 41, adjacent the rear end thereof, is rotatably mounted within a tapered roller bearing assembly 43 suitably secured in the rear end wall of the transmission housing 20. A bevel gear 40 is formed integrally with the output shaft 41, rearwardly of the tapered roller bearing assembly 43. The bevel gear 40 is adapted to have meshing engagement with a drive axle ring gear (not shown). Mounted concentrically about the output shaft 41 is an annular bearing race 44, about the outer periphery of which, at the forward end thereof, is mounted a plurality of needle bearings 45 and at the rear end thereof a plurality of needle bearings 46.

Journaled on the needle bearings 45 and 46 is a compound gear member 47 which, at its forward end, is formed with a gear portion 48 and at its rear end with a gear portion 49. The gear portion 48 of the compound gear 47 meshes with the aforedescribed gear portion 26 formed in the rear end of the input shaft 22. The gear portion 49 of the compound gear 47 meshes with a gear 50, which is journaled on an annular bushing member 51 arranged concentrically about the main shaft 31.

The race member 44, needle bearings 45 and 46, and the compound gear 47 are retained in position by means of suitable thrust washers 52 and 53. The annular bushing member 51 and the gear 50 are maintained in position by means of thrust washers 54 and 55 and a retaining ring 56, suitably fixed in the main shaft 31.

A clutch mechanism, indicated generally by the reference numeral 61, is disposed concentrically about the main shaft 31, intermediate of the rear end of the input shaft 22 and the gear 50. The clutch mechanism 61 comprises a clutch hub 62, which is formed with a radially extending flange portion 63. The hub 62 is also formed with internal straight splines which are disposed in engagement with the straight splines 32 of the main shaft 31. The hub 62 is mounted to the main shaft 31 for conjoint rotation therewith, but is free to move axially.

The clutch hub 62, adjacent each side of the flange 63, is formed with external straight splines 64 and 65. Mounted on the splines 64 of the clutch hub 62 are the internal straight splines 66 of an inner annular clutch element 67, which is thus mounted for conjoint rotation with the clutch hub 62, but is free to move axially relative to the clutch hub 62. Axial movement of the clutch element 67 to the left, as viewed in Figure 1, relative to the clutch hub 62, is limited by a retaining ring 69 which is fixed in the clutch hub 62. The clutch element 67, at its forward end, is formed with circumferentially spaced radially extending clutch or ratchet teeth 70 which are adapted to be disposed selectively in engagement with circumferentially spaced radially extending clutch or ratchet teeth 71 formed on the rear radial surface of the flange portion 27 of the input shaft 22.

The clutch element 67 is formed with external straight splines 72 which have engagement with the internal straight splines 73 of an outer annular clutch element 74. The clutch element 74, at its forward end, is formed with circumferentially spaced radially extending clutch or ratchet teeth 75, which are adapted to be disposed selectively in engagement with circumferentially spaced radially extending clutch or ratchet teeth 76 formed on the rear radial surface of the flange portion 27 of the input shaft 22.

The outer clutch element 74 is mounted on the inner clutch element 67 for conjoint rotation therewith and limited axial movement therealong. Axial movement of the clutch element 74 to the left, relative to the clutch hub 62, is limited by an annular retaining member 77 which is suitably fixed to the radial flange 63 of the clutch hub 62. Interposed between the radial flange 63 of the clutch hub 62 and the rear end of the clutch elements 67 and 74 is a conical spring 78 which normally biases the clutch elements 67 and 74 to the position shown in Figure 1. It will be apparent to those skilled in the art that due to the intersplined relation between the main shaft 31, the clutch hub 62, clutch element 67, and clutch element 74, the clutch elements 74 and 67 and the clutch hub 62 rotate conjointly with the shaft 31.

Disposed in engagement with the external straight splines 65 of the clutch hub 62 are the internal straight splines 81 of an inner annular clutch element 82 which is thus mounted for conjoint rotation with the clutch hub 62, but is free to move axially relative thereto. The clutch element 82, at the rear end thereof, is formed with circumferentially spaced radially extending clutch or ratchet teeth 83 which are adapted to be disposed selectively in engagement with circumferentially spaced radially extending clutch or ratchet teeth 84 formed on the forward radial wall of the gear 50. The inner clutch element 82, at its outer periphery, is provided with straight splines 85 which cooperate with the internal straight splines 86 of an outer annular clutch element 87. The clutch element 87 is thus mounted for conjoint rotation with the inner clutch element 82, but is free to move axially relative thereto. The outer clutch element 82, adjacent the rear end thereof, is provided with circumferentially spaced radially extending clutch or ratchet teeth 88 which are adapted to be disposed selectively in engagement with circumferentially spaced radially extending clutch or ratchet teeth 89 formed in the forward radial wall of the gear 50.

Axial movement of the inner clutch element 82 toward the right, relative to the clutch hub 62, is limited by a retaining ring 90 suitably fixed in the clutch hub 62. Relative movement of the outer clutch element 87 to the right is limited by a retaining member 91 suitably secured to the radial flange 63 of the clutch hub 62. Interposed between the flange 63 of the clutch hub 62 and the forward ends of the clutch elements 82 and 87 is a conical spring 92 which is adapted to normally bias the clutch elements 82 and 87 to the position shown in Figure 1, relative to the clutch hub 62.

The clutch mechanism 61 is adapted to be disposed in one of three positions. In the position shown in Figure 1, the clutch mechanism 61 clutches the gear 50 to the main shaft 31 for providing a low range drive between the input shaft 22 and the main shaft 31. The clutch mechanism 61 may be moved a short distance to the left, from the position shown in Figure 1, until the clutch mechanism 61 is disengaged from clutching engagement with the gear 50, thus providing for neutral. If the clutch mechanism 61 is moved axially still farther to the left from the position shown in Figure 1, until the clutch mechanism 61 is disposed in engagement with the rear end of the input shaft 22, direct drive or high range drive is effected between the input shaft and the main shaft 31.

The driving faces of the clutch or ratchet teeth 70 and 71 are arranged so that when the teeth are engaged driving torque is transmitted therebetween when the input shaft 22 tends to overrun the main shaft 31, as would be the case during acceleration of the vehicle in which the transmission of my present invention is incorporated. The driving faces of the clutch or ratchet teeth 75 and 76 are arranged so that when the teeth are engaged driving torque is transmitted therebetween when the main shaft 31 tends to overrun the input shaft 22, as would be the case when the vehicle was coasting.

The driving faces of the clutch or ratchet teeth 83 and 84 are arranged so that when the teeth are engaged driving torque is transmitted therebetween when the gear 50 tends to overrun the main shaft 31, and the driving faces of the clutch or ratchet teeth 88 and 89 are arranged so that when the teeth are engaged driving torque is transmitted therebetween when the main shaft 31 tends to overrun the gear 50.

With the clutch mechanism 61 in the position shown in Figure 1, low range drive is effected between the input shaft 22 and the main shaft 31 when the main clutch (not shown) is engaged and the prime mover (not shown) is rotating. Should it be desired to place the transmission in a neutral position, the main clutch is disengaged and the clutch hub 62 of the clutch mechanism 61 is shifted a short distance to the left from the position shown in Figure 1, until the clutch teeth 83 of the inner clutch element 82 and the clutch teeth 88 of the outer clutch element 87 are removed respectively from engagement with the clutch teeth 84 and 89 of the gear 50. It will be apparent that when the clutch mechanism 61 is moved to a central position, no drive will be effected to the main shaft 31 from the input shaft 22, even though the main clutch should be engaged with the prime mover rotating.

Should it be desired to effect direct drive or high range drive between the input shaft 22 and main shaft 31, the clutch hub 62 of the clutch mechanism 61 is moved to its extreme left position, while the main clutch (not shown) is disengaged. If, at the time the clutch mechanism 61 is shifted to the left, the input shaft 22 is overrunning the main shaft 31, the ratchet teeth 70 of the inner clutch element 67 will be disposed in driving relation with the ratchet teeth 71 of the flange 27 of the input shaft 22. While the ratchet teeth 70 are engaging the ratchet teeth 71, the slopes of the ratchet teeth 75 of the outer clutch element 74 will engage the slopes of the ratchet teeth 76 on the flange 27 of input shaft 22, and the slopes of the ratchet teeth 75 will momentarily ride back upon the slopes of the ratchet teeth 76, which movement is permitted by the deflection of the spring 78. The instant before the ratchet teeth 70 are in driving engagement with the ratchet teeth 71, the spring 78 will cause the ratchet teeth 75 to be snapped into full engagement with the ratchet teeth 76.

If, at the time the clutch mechanism 61 is shifted to its extreme left position, the main shaft 31 is tending to overrun the input shaft 22, the ratchet teeth 75 of the outer clutch element 74 will be disposed in driving engagement with the ratchet teeth 76 on flange 27 of the input shaft 22. Prior to full engagement of the ratchet teeth 75 and 76, the slopes of the ratchet teeth 70 of the inner clutch element 67 will ride back upon the slopes of the ratchet teeth 71 on flange 27 of input shaft 22. At the instant before the ratchet teeth 75 and 76 are in full driving engagement, the spring 78 will cause the ratchet teeth 70 to be snapped into driving relation with the ratchet teeth 71.

It will thus be apparent to those skilled in the art, from the above description, that the direction of relative rotation between the input shaft 22 and the main shaft 31 in no way affects the full engagement of the clutch mechanism 61. In other words, when the clutch hub 62 is initially biased to the left, if the input shaft 22 is overrunning the main shaft 31, the ratchet teeth 70 and 71 will drivingly connect the shafts 22 and 31, while the ratchet teeth 75 are snapped into engagement with the ratchet teeth 76, and if the main shaft 31 is overrunning the input shaft 22, the ratchet teeth 75 and 76 will drivingly connect the shafts 22 and 31, while the ratchet teeth 70 are snapped into engagement with the ratchet teeth 71. In order to permit the engagement of the ratchet teeth in either direction of relative rotation between the input shaft 22 and the main shaft 31 in the manner above described, the ratchet teeth 70 and 75, as well as the ratchet teeth 71 and 76, must be properly indexed with respect to each other. Proper indexing of the ratchet teeth is also necessary to provide the required clearance or backlash between the two sets of ratchet teeth for easy disengagement of the latter.

The above described clutch mechanism 61 will always engage and lock in driving relation without any possibility of the ratchet teeth burring at their ends and failing structurally due to the ends being chipped or broken off. Thus, there is no contamination of the lubricant of the transmission, as occurs when the usual type of shift mechanisms are employed. Since chipping of the ratchet teeth of the clutch mechanism 61 and the resultant contamination of the transmission lubricant are absent, it will be obvious to those skilled in the art that the length of the life of the bearings, gears, as well as the clutch teeth, is materially increased.

The above described clutch mechanism 61 is substantially limited to use for coupling together two members normally rotating in the same direction, since the relatively high speed of two members, normally rotating in opposite directions, and the certainty of the engagement of the ratchet teeth, would cause such heavy blows against the driving faces of the ratchet teeth that the latter, in many instances, would be broken.

Clutching of the gear 50 to the main shaft 31 through the clutch mechanism 61 is effected by biasing the clutch hub 62 to the right, at which time the clutch teeth 83 and 84, and 88 and 89, will engage in the same manner as the clutch teeth 70 and 71, and 75 and 76, described above, during clutching of the input shaft 22 to the main shaft 31. It is, therefore, believed that a detailed description of the clutching of the gear 50 to the main shaft 31 is unnecessary for purposes of the present disclosure.

A pair of axially spaced gears 93 and 94 are splined to the output shaft 41, intermediate of the compound gear 47 and the tapered roller bearing assembly 43. The gears 93 and 94 are retained in proper position by means of the aforedescribed thrust washer 53, the tapered roller bearing assembly 43, and an annular spacer member 95. The gear 93 has meshing engagement with an idler gear (not shown) and the idler gear, in turn, has meshing engagement with a gear 96 journaled on an annular bushing member 97 disposed concentrically about the main shaft 31. The bushing member 97 and the gear 96 are maintained in axial position by means of the aforedescribed thrust washer 55 and a thrust washer 98.

The gear 94 on the output shaft 41 has meshing engagement with a gear 99 journaled on an annular bushing member 100 disposed concentrically about the main shaft 31. The bushing member 100 and the gear 99 are maintained in axial position by means of thrust washers 101 and 102.

A clutch mechanism, indicated generally by the reference numeral 111, is disposed concentrically about the main shaft 31, intermediate of the gears 96 and 99. When the gear 99 is clutched to the main shaft 31 by the clutch mechanism 111, in a manner to be described hereinafter, forward drive is effected to the output shaft 41. When the gear 96 is clutched to the main shaft 31 through the clutch mechanism 111, reverse drive is effected to the output shaft 41.

The clutch mechanism 111 comprises an annular sleeve 113, which is suitably splined to the main shaft 31 and is maintained in axial position by means of the aforedescribed thrust washers 98 and 101. The sleeve member 113 is formed with external straight splines 114, which mate with the internal straight splines 115 of an annular clutch hub 116. The clutch hub 116 is thus mounted for conjoint rotation with the sleeve member 113 and the main shaft 31, but is free for axial movement therealong. The clutch hub 116, at the forward end thereof, is formed with circumferentially spaced radially extending clutch or ratchet teeth 117 which are adapted to be disposed selectively in engagement with circumferentially spaced radially extending clutch or ratchet teeth 118 formed in the rear radial wall of the gear 96. The clutch hub 116, at the rear end thereof, is formed with radially extending circumferentially spaced clutch or ratchet teeth 119, which are adapted to be disposed selectively in engagement with circumferentially spaced radially extending clutch or ratchet teeth 120 formed in the forward radial wall of the gear 99.

The clutch hub 116 is further formed with a radially extending centrally located flange portion 121 and on each side of the flange portion 121, the clutch hub 116 is provided with external straight splines 122 and 123. Disposed in engagement with the straight splines 122 are the internal straight splines 124 of a clutch element 125. The clutch element 125, at its forward end, is formed with circumferentially spaced radially extending clutch or ratchet teeth 126 which are adapted to be disposed selectively in engagement with circumferentially spaced radially extending clutch or ratchet teeth 127 formed integrally with the rear radial surface of the gear 96. The clutch element 125 is mounted for conjoint rotation with the clutch hub 116, but is free to move axially therealong. Axial movement of the clutch element 125 to the left, relative to the clutch hub 116, is limited by a retaining ring 128. A coil spring 134 is interposed between the forward radial surface of flange 121 of the clutch hub 116 and the clutch element 125 for normally biasing the latter to the position shown in Figure 1, relative to the clutch hub 116.

The external splines 123 of the clutch hub 116 mate with the internal straight splines 129 of a clutch element 130. The clutch element 130, at its rear end, is formed with circumferentially spaced radially extending clutch or ratchet teeth 131 which are adapted to be disposed selectively in engagement with circumferentially spaced radially extending clutch or ratchet teeth 132 formed in the forward radial surface of the gear 99. The clutch element 130 is mounted on the clutch hub 116 for conjoint rotation therewith, but is free to move axially therealong. Axial movement of the clutch element 130 to the right, relative to the clutch hub 116, is limited by a retaining ring 133. A coil spring 135 is interposed between the rear radial surface of the flange 121 of the clutch hub 116 and the clutch element 130 for normally biasing the latter to the position shown in Figure 1, relative to the clutch hub 116. With the clutch mechanism 111 disposed to the right for forward drive, drive is effected between the shaft 31 and gear 99 through the clutch teeth 119 and 120 when shaft 31 is driving, as, for example, during acceleration, and through clutch teeth 131 and 132 when the gear 99 is driving, as would be the case when the vehicle is coasting.

In order to prevent the clutch hub 116 from being shifted axially when the relative speeds of rotation between the main shaft 31 and the gears 96 or 99 are above a predetermined safe limit, a novel form of centrifugal governor is incorporated with the clutch hub 116. As best shown in Figure 2, the centrifugal governor comprises arcuate flyweights 142, which number two in the specific embodiment disclosed herein. The flyweights are pivotally mounted within a central opening formed in the clutch hub 116 on pivot pins 143, which are suitably fixed in the clutch hub 116. The one ends of leaf spring members 144 are suitably fixed in the one ends of the arcuate flyweights 142, and the spring members 144, at their free ends, are adapted to engage the inner periphery of the clutch hub 116.

The other ends of the arcuate flyweights 142 are each formed with a suitable tooth portion 145, which is adapted to cooperate with one of two sets of notches 146 and 147 formed in the outer periphery of the sleeve member 113.

When the main shaft 31 is rotating, the ends of the arcuate flyweights 142, to which the springs 144 are secured, are forced outwardly by means of centrifugal force against the force of springs 144, thereby causing the tooth portions 145 to be disposed in engagement with the adjacent notch 146 or 147 formed in the sleeve member 113. With the clutch mechanism 111 in the position shown in Figure 1, if the shaft 31 rotates above a predetermined safe speed, the tooth portions 145 of the flyweights 142 will be disposed in engagement with the notches 146, thereby preventing axial movement of the clutch hub 116 to the left, from the position shown in Figure 1, even though the clutch hub 116 should be biased to the left. As soon as the speed of the main shaft 31 decreases to a speed where a shift may be safely made, the springs 144 urge the flyweights 142 to rotate counterclockwise about the pins 143, causing the tooth portions 145 to be withdrawn from engagement with the notches 146.

Assuming a shift is to be made from forward to reverse drive, with the main shaft 31 rotating below the predetermined safe speed, the clutch hub 116 is biased to the left from the position shown in Figure 1, until the clutch or ratchet teeth 117 engage the clutch or ratchet teeth 118. Simultaneously, the slopes of the spring pressed clutch or ratchet teeth 126 will ride over the slopes of the clutch or ratchet teeth 127 of gear 96 and will be snapped into position at substantially the instant that the ratchet teeth 117 are disposed in full driving engagement with the ratchet teeth 118. Drive is effected between the shaft 31 and gear 96 through the clutch teeth 117 and 118 when shaft 31 is driving, as, for example, during acceleration, and through the clutch teeth 126 and 127 when the gear 96 is driving, as, for example, during coasting of the vehicle.

Engagement of the clutch teeth 117 and 118, and 126 and 127, is effected without gear clash or undue stress being placed on the gear teeth. When the clutch hub 116 is disposed in its extreme left position for reverse drive, the tooth portions 145 of the flyweights 142 will be disposed in engagement with the notches 147 when the main shaft 31 is accelerated above the predetermined safe speed, thus preventing axial movement of the clutch hub 116 during rotation of the main shaft 31 above the predetermined safe speed.

It will be apparent to those skilled in the art that the characteristics of the springs 144 may be varied to alter the speed at which the tooth portions 145 of the flyweights 142 will be disposed in engagement with either of the sets of notches 146 or 147.

Since the direction of rotation of the clutch teeth of the clutch mechanism 111, relative to the clutch teeth of either of the gears 96 or 99 during engagement, is known, only the sets of clutch teeth 126 and 131 of the clutch mechanism 111 need be spring loaded, while the sets of clutch teeth 117 and 119 may be formed integrally with the clutch hub 116.

The main shaft 31 may be driven in either one of two drive ratios and the output shaft 41 may be driven in either a forward or reverse direction, and thus the transmission of my present invention provides for two forward or two reverse drive ratios between the input shaft 22 and the output shaft 41. The inclusion of the clutch mechanisms 61 and 111 in the transmission of my present invention permits selective shifting to take place without danger of damaging the mechanism or clutch teeth while selecting either one of the two drive ratios or directions of rotation.

Now, while I have shown and described what I believe to be a preferred form of my present invention, it will be understood that various rearrangements and modifications may be made therein without departing from the spirit and scope of my present invention.

I claim:

1. In a transmission having a drive member, a driven member, a first clutch element for clutching said drive member to said driven member in one direction of rotation of said drive member relative to said driven member, a second clutch element for clutching said drive member to said driven member in the other direction of rotation of said drive member relative to said driven member, and said clutch elements being arranged with engaging means so that either one of said clutch elements may be engaged while the other of said clutch elements yields during engagement of said one clutch element but snaps into full engagement at the moment of full engagement of said one clutch element.

2. In a transmission having a drive member and a driven member, a first clutch element nonrotatably mounted relative to said driven member and axially movable therealong for clutching said drive member to said driven member in one direction of rotation of said drive member relative to said driven member, a second clutch element nonrotatably mounted relative to said first clutch element and axially movable therealong for clutching said drive member to said driven member in the other direction of rotation of said drive member relative to said driven member, and said clutch elements being arranged with engaging means so that either one of said clutch elements may be engaged while the other of said clutch elements yields during engagement of said one clutch element but snaps into full engagement at the moment of full engagement of said one clutch element whereby said drive and driven members may be positively clutched together irrespective of the direction of rotation of said drive member relative to said driven member.

3. In a transmission having a drive member and a driven member, a clutch hub nonrotatably mounted on said driven member and axially movable therealong, a first clutch element nonrotatably mounted relative to said clutch hub and axially movable therealong for clutching said drive member to said driven member in one direction of rotation of said drive member relative to said driven member, a second clutch element nonrotatably mounted relative to said first clutch element and axially movable therealong for clutching said drive member to said driven member in the other direction of said drive member relative to said driven member, and said clutch elements being arranged with engaging means so that either one of said clutch elements may be engaged while the other of said clutch elements yields during engagement of said one clutch element but snaps into full engagement at the moment of full engagement of said one clutch element whereby said drive and driven members may be positively clutched together irrespective of the direction of rotation of said drive member relative to said driven member.

4. The combination of claim 3 wherein said engaging means comprises a coil spring arranged between said clutch hub and said first and second clutch elements.

5. In a transmission having a drive member and a driven member, a clutch hub nonrotatably mounted relative to said driven member and axially movable therealong, a first clutch element nonrotatably mounted relative to said clutch hub and axially movable therealong, ratchet teeth formed at one end of said first clutch element adapted to be disposed selectively in engagement with ratchet teeth formed on said drive member for effecting drive between said drive and driven members in one direction of rotation of said drive member relative to said driven member, a second clutch element nonrotatably mounted on said first clutch element and axially movable therealong, ratchet teeth formed at one end of said second clutch element adapted to be disposed selectively in engagement with ratchet teeth formed on said drive member for effecting drive between said drive and driven members in the other direction of rotation of said drive member relative to said driven member, and said clutch elements being arranged with engaging means so that either one of said clutch elements may be engaged while the other of said clutch elements yields during engagement of said one clutch element but snaps into full engagement at the moment of full engagement of said one clutch element whereby said drive and driven members may be positively clutched together irrespective of the direction of rotation of said drive member relative to said driven member.

6. In a transmission having a drive member and a driven member, a first clutch element for clutching said drive member to said driven member in one direction of rotation of said drive member relative to said driven member, a second clutch element for clutching said drive member to said driven member in the other direction of rotation of said drive member relative to said driven member, and speed responsive means for preventing engagement of said first and second clutch elements only when said drive member is rotating above a predetermined safe speed.

7. The combination of claim 6 wherein said last named means prevents disengagement of said first and second clutch elements only when the latter have been engaged with said driven member and said drive member rotates above a predetermined safe speed.

8. In a transmission having a drive member and a driven member, a first clutch element nonrotatably mounted relative to said driven member and axially movable therealong for clutching said drive member to said driven member in one direction of rotation of said drive member relative to said driven member, a second clutch element nonrotatably mounted relative to said first clutch element and axially movable therealong for clutching said drive member to said driven member in the other direction of rotation of said drive member relative to said driven member, speed responsive means for preventing engagement of said first and second clutch elements only when said drive member is rotating above a predetermined safe speed, and said last named means preventing disengagement of said first and second clutch elements when the latter have been engaged with said driven member and said drive member rotates above a predtermined safe speed.

9. In a change speed gear assembly having a drive member and a driven member, a clutch hub nonrotatably mounted relative to said driven member and axially movable therealong, a first clutch element nonrotatably mounted relative to said clutch hub and axially movable therealong, ratchet teeth formed at one end of said first clutch element adapted to be disposed selectively in engagement with ratchet teeth formed on said drive member for effecting drive between said drive and driven members in one direction of rotation of said drive member relative to said driven member, a second clutch element nonrotatably mounted on said first clutch element and axially movable therealong, ratchet teeth formed at one end of said second clutch element adapted to be disposed selectively in engagement with ratchet teeth formed on said drive member for effecting drive between said drive and driven members in the other direction of rotation of said drive member relative to said driven member, and said ratchet teeth being arranged so that one set of ratchet teeth may be positively engaged while the other set of ratchet teeth will yield during engagement of said one set but will snap into positive engagement at the moment of engagement of said one set irrespective of the direction of relative rotation between said drive and driven members.

10. In a transmission having a drive member and a driven member, a clutch hub nonrotatably mounted relative to said driven member and axially movable therealong, said clutch hub having a radially extending flange, external straight splines formed in said clutch hub at one end thereof, a first clutch element having internal straight splines cooperating with the external splines of said clutch hub, said first clutch element having ratchet teeth adapted to be disposed selectively in engagement with ratchet teeth formed on said drive member for effecting drive between said drive and driven members in one direction of rotation of said drive member relative to said driven member, external straight splines formed on said first clutch element, a second clutch element having internal straight splines cooperating with the external straight splines of said first clutch element, ratchet teeth formed at one end of said second clutch element adapted to be disposed selectively in engagement with ratchet teeth formed on said drive member for effecting drive between said drive and driven members in the other direction of rotation of said drive member relative to said driven member, a coil spring disposed between said radial flange and said first and second clutch elements for effecting engagement of one of said first and second clutch elements while the other of said clutch elements is permitted to yield during engagement of said one clutch element but is snapped into full engagement at the moment of full engagement of said one clutch element whereby said drive and driven members may be positively clutched together irrespective of the direction of rotation of said drive member relative to said driven member.

11. In a change speed gear assembly having first and second rotatable members, a first clutch element non-rotatably mounted relative to said second rotatable member and axially movable therealong, ratchet teeth formed at one end of said first clutch element adapted to be disposed selectively in engagement with ratchet teeth formed on said first rotatable member for effecting drive between said first and second rotatable members in one direction of rotation of said first rotatable member relative to said second rotatable member, a second clutch element non-rotatably mounted on said first clutch element and axially movable therealong, ratchet teeth formed at one end of said second clutch element adapted to be disposed selectively in engagement with ratchet teeth formed on said first rotatable member for effective drive between said first and second rotatable member in the other direction of rotation of said first rotatable member relative to said second rotatable member, said ratchet teeth being arranged so that one set of ratchet teeth may be positively engaged while the other set of ratchet teeth will yield during engagement of said one set but will snap into positive engagement at the moment of engagement of said one set, and the termini of said sets of ratchet teeth lying in the same planes when both said sets of ratchet teeth are in full engagement.

12. In a transmission having a drive member and a driven member, a clutch hub nonrotatably mounted relative to said drive member and axially movable therealong, a first clutch element at one end of said clutch hub, said first clutch element including ratchet teeth adapted to be disposed selectively in engagement with ratchet teeth formed on said driven member for effecting drive between said drive and driven members in one direction of rotation of said drive member relative to said driven member, a set of external straight splines formed on said clutch hub, a second clutch element having internal straight splines cooperating with the first set of external straight splines of said clutch hub, ratchet teeth formed at one end of said second clutch element adapted to be disposed selectively in engagement with ratchet teeth formed on said driven member for effecting drive between said drive and driven members in the other direction of rotation of said drive member relative to said driven member, said ratchet teeth being arranged so that one set of ratchet teeth may be positively engaged while the other set of ratchet teeth will yield during engagement of said one set but will snap into positive engagement at the moment of engagement of said one set, said drive shaft having two sets of axially spaced notches, centrifugally actuated flyweights mounted within said clutch hub, the one ends of said flyweights being adapted to engage one of said sets of notches in the drive shaft for preventing axial movement of said clutch hub and engagement of said first and second clutch elements only when said drive shaft rotates above a predetermined speed, and said one ends of said flyweights being adapted to engage the other of said sets of notches in said drive shaft for preventing axial movement of said clutch hub shaft and disengagement of said first and second clutch elements only when the latter have been engaged with said driven member and said drive member rotates above a predetermined safe speed.

References Cited in the file of this patent

UNITED STATES PATENTS

| 344,611 | Applegate | June 29, 1886 |
| 2,166,004 | Hall | July 11, 1939 |
| 2,384,418 | Edmondson | Sept. 4, 1945 |
| 2,542,911 | Eaton | Feb. 20, 1951 |
| 2,612,783 | Brock et al. | Oct. 7, 1952 |

FOREIGN PATENTS

| 718,972 | Germany | Mar. 25, 1942 |